United States Patent
Lewit et al.

[19]

[11] Patent Number: 5,908,591
[45] Date of Patent: Jun. 1, 1999

[54] METHOD FOR MAKING COMPOSITE STRUCTURES

[75] Inventors: Scott M. Lewit, Malabar; Neil Rohan, New Smyrna Beach, both of Fla.

[73] Assignee: COMPSYS, Inc., West Melbourne, Fla.

[21] Appl. No.: 08/906,178

[22] Filed: Aug. 4, 1997

Related U.S. Application Data

[63] Continuation-in-part of application No. 08/651,621, May 21, 1996, Pat. No. 5,800,749, which is a continuation of application No. 08/345,899, Nov. 28, 1994, abandoned, which is a continuation-in-part of application No. 08/181,321, Jan. 14, 1994, Pat. No. 5,429,066.

[51] Int. Cl.⁶ .......................... B29C 44/06; B29C 44/12
[52] U.S. Cl. ......................... 264/46.4; 156/77; 156/182; 264/257; 264/273
[58] Field of Search ...................... 264/46.4, 257, 264/258, 273; 156/77, 182

[56] References Cited

U.S. PATENT DOCUMENTS

| | | |
|---|---|---|
| 2,648,619 | 8/1953 | Alderfer . |
| 2,866,730 | 12/1958 | Potchen et al. . |
| 3,435,470 | 4/1969 | Krenzler . |
| 3,567,565 | 3/1971 | Jones et al. . |
| 3,607,600 | 9/1971 | Schreter et al. . |
| 3,835,720 | 9/1974 | Fisher et al. . |
| 3,840,926 | 10/1974 | Stoberl . |
| 3,848,284 | 11/1974 | Livingston . |
| 3,867,221 | 2/1975 | Chant ..................................... 264/46.4 |
| 3,873,654 | 3/1975 | Smith . |
| 3,989,781 | 11/1976 | Chant ..................................... 264/46.4 |
| 4,051,210 | 9/1977 | Wallenberger ......................... 264/46.4 |
| 4,065,150 | 12/1977 | Van Auken . |
| 4,065,820 | 1/1978 | Starratt, Jr. . |
| 4,099,280 | 7/1978 | Hoppe et al. . |
| 4,205,408 | 6/1980 | Glass et al. . |
| 4,263,247 | 4/1981 | Berger et al. . |
| 4,268,571 | 5/1981 | McCarthy . |
| 4,323,406 | 4/1982 | Morello . |
| 4,372,900 | 2/1983 | Doerfling . |
| 4,471,020 | 9/1984 | McCarthy . |
| 4,510,020 | 4/1985 | Samovich . |
| 4,511,523 | 4/1985 | Hsu . |
| 4,568,603 | 2/1986 | Oldham . |
| 4,681,798 | 7/1987 | Gill et al. . |
| 4,695,501 | 9/1987 | Robinson . |
| 4,714,575 | 12/1987 | Preston ................................... 264/46.4 |
| 4,764,238 | 8/1988 | Dastin et al. . |
| 4,800,114 | 1/1989 | Cichanowski . |
| 4,801,496 | 1/1989 | Buchacher . |
| 4,812,194 | 3/1989 | Pelz . |
| 4,851,283 | 7/1989 | Holtrop et al. . |
| 4,867,826 | 9/1989 | Wayte . |
| 4,877,476 | 10/1989 | Wolf . |
| 4,891,176 | 1/1990 | Drysdale et al. ....................... 264/257 |

(List continued on next page.)

*Primary Examiner*—Allan R. Kuhns
*Attorney, Agent, or Firm*—Quarles & Brady LLP

[57] ABSTRACT

A method for making a composite structure, comprising the steps of: arranging a fabric layer in a configuration constrained against outward movement and defining a cavity between opposing surfaces of the fabric layer; dispensing a predetermined amount of a self-expanding, self-curable, uncured structural foam into the cavity, the foam expanding and curing in the cavity at a molding pressure determined by the predetermined amount of the foam and thereby attaching itself to the fabric layer to form the composite structure, the molding pressure causing the expanding foam to substantially fill only interstices of an inner portion of the fabric layer, without substantially penetrating an outer portion of the fabric layer; and, freeing the cured composite structure from the constraint of the arranging step, the outer portion of the fabric layer of the composite structure being thereafter substantially completely saturable with a curable material for lamination to another structure in a subsequent processing step. The method can further comprise the step of laminating the cured composite structure to another composite structure by saturating the outer portion of the fabric layer of the cured composite structure with a curable resin.

6 Claims, 7 Drawing Sheets

U.S. PATENT DOCUMENTS

| | | | |
|---|---|---|---|
| 4,910,067 | 3/1990 | O'Neill | 264/46.4 |
| 4,942,075 | 7/1990 | Hartel et al. . | |
| 4,954,377 | 9/1990 | Fischer et al. . | |
| 4,988,469 | 1/1991 | Reavely et al. . | |
| 4,995,675 | 2/1991 | Tsai . | |
| 5,061,418 | 10/1991 | Ware | 264/46.4 |
| 5,068,001 | 11/1991 | Haussling . | |
| 5,087,491 | 2/1992 | Barrett . | |
| 5,098,346 | 3/1992 | Redmond . | |
| 5,173,227 | 12/1992 | Ewen et al. | 264/46.4 |
| 5,227,227 | 7/1993 | Boulanger . | |
| 5,230,844 | 7/1993 | Macaire et al. . | |
| 5,250,132 | 10/1993 | Lapp et al. . | |
| 5,258,585 | 11/1993 | Juriga . | |
| 5,304,339 | 4/1994 | Le Comte . | |
| 5,308,675 | 5/1994 | Crane et al. . | |
| 5,364,061 | 11/1994 | Ciolczyk et al. . | |
| 5,413,661 | 5/1995 | Spengler et al. . | |
| 5,429,066 | 7/1995 | Lewit et al. | 264/46.4 |
| 5,446,250 | 8/1995 | Oka . | |
| 5,487,854 | 1/1996 | Leoni | 264/46.4 |

METHOD FOR MAKING COMPOSITE STRUCTURES

CROSS REFERENCE TO RELATED APPLICATION

This application is a continuation-in-part of application Ser. No. 08/651,621, filed May 21, 1996, now Pat. No. 5,800,749. Application Ser. No. 08/651,621 is a continuation of application Ser. No. 08/345,899, filed Nov. 28, 1994, now abandoned. Application Ser. No. 08/345,899 is a continuation-in-part of application Ser. No. 08/181,321, filed Jan. 14, 1994, now U.S. Pat. No. 5,429,066.

BACKGROUND OF THE INVENTION

1. Field of the Invention

This invention relates to a composite structure and method of making composite structures. More particularly, the invention relates to composite structures which are especially adapted for simplifying fabrication of a number of articles such spas, baths, Jacuzzis, shower enclosures and the like. The composite structure in accordance with the invention is especially adapted for use in lower stress environments than such composite structure technology has generally been applied to in the past.

2. Description of Related Art

In the past, a number of structural composite articles have been developed using a variety of different technologies. One prior art technique involves interweaving yarns of polyester fibers with yarns of glass fibers to form a composite fabric. The fabric is then fitted within a mold and soaked with resin. The formed fabric and resin composition is then allowed to harden within the mold. While providing a generally rigid structure, such a technique includes a number of limitations, among them the inability to produce a variety of different shapes of substantial bulk or complex dimensions.

Another prior art technique involves manufacturing a light weight energy-absorbing structure made up of a laminate including a plurality of fabrics. The fabrics are pre-impregnated with a thermosetting resin and abutted against a core of cellular foam which has had a bonding material applied at the interface between the impregnated fabric and the foam. Heat is applied to cure the resin and the bonding material. However, when bonding material is used, it is often the case in hostile environments that the bonding material breaks down, an undesirable result when such structures are used in high load or stress applications.

Yet still another prior art technique involves the manufacture of a thermo-formable composite article comprised of a core layer made of a synthetic resin foam. A pair of adhesive layers are placed in contact with the opposite upper and lower surfaces of the core layer and a pair of fabric layers are superimposed on the opposite upper and lower surfaces of the core layer. The fabric layers are bonded to the core layer by the adhesive layers. At least one of the fabric layers is made of a non-woven fabric which has been impregnated with a thermoplastic or thermosetting resin. This technique also involves the disadvantages noted above with respect to the use of adhesives.

In boat building, especially glass fiber boats, hulls are typically reinforced by a grid arrangement of structural members known as "stringers" and "bulkheads," hereafter collectively referred to as "stringers." Present boat-building technology typically employs plywood stringers, although a small percentage uses glass fiber/foam stringers. The plywood stringer system involves several process stages. The plywood is first cut to shape by a cutter or by hand with the use of templates. The stringer system which is commonly made up of interlocking stringers and bulkheads is assembled outside of the boat, with interlocking pieces being held with staples. Once the system is assembled, it is then placed in a boat as a module and laminated into place using a combination of reinforcing fabrics.

Glass fiber stringers are installed in a slightly different manner from plywood stringers. One way of installing such stringers is to cut blocks of foam into the shape of the stringers. The stringer shaped foam is then bonded into the hull and covered with glass fiber. Another way is that the glass fiber shell of the stringer is first laminated using a male mold. The stringer is then ground to fit into the boat and once the stringer has been ground to fit, it is spaced off of the bottom of the boat to avoid cracking problems. The stringer is then laminated into place and holes are drilled into the stringer and the stringer is filled with a two-part urethane foam.

Future boat construction is expected to use closed molding technologies. The reason for this is 1) to control noxious vapor emissions into the environment, 2) to reduce labor costs and 3) to create structurally superior constructions. Such future technology will generally require use of stringer systems made of composite structures compatible with such closed moldings. Conventional stringer systems are not well suited to such technologies since they will need to be installed after the hull has been laminated using an open mold. Wood stringers would be difficult to incorporate into a closed mold due to height and width constraints. Further, prepositioning of glass fiber reinforcement normally hand laminated over the wood or foam stringer system would be costly and create quality control problems. Conventional glass fiber stringers also pose problems due to the void in the stringer structures. Specifically, since foam is injected into such stringer after installation, it becomes difficult to keep the resin from filling the inside of the stringer.

In accordance with the invention, these and other problems with the prior art are avoided by providing a composite structure and method of making such structure which avoids the use of adhesive and lends itself to a variety of shapes, structures and applications. In one specific aspect, the composite articles manufactured in accordance with the method are used as stringers and bulkheads in boat manufacturing technology greatly simplifying the manufacture of boats, and permitting their use in closed mold environments.

SUMMARY OF THE INVENTION

The construction methods discussed above require reinforced fabric layers for adequate strength of the final composite structure. However, composite structures can be used in applications requiring less strength than frames for boats and the like. One example is as reinforcing members for spas, baths, Jacuzzis, shower enclosures and the like. The composite structure in accordance with the invention is especially adapted for use in lower stress environments than such composite structure technology has generally been applied to in the past. Such structures need to be stiffened and reinforced, but do not require the same level of reinforcement as, for example, boats. In this regard, it has been realized that composite structures intended for lighter loads can be efficiently and inexpensively manufactured according to the techniques developed for high strength applications as taught in U.S. Pat. No. 5,429,066, but without the need for reinforcing the fabric layer, typically a non-woven fabric layer, provided that penetration of the curing foam is controlled so as to leave an outer portion of the fabric layer of the cured composite structure substantially free of cured resin.

A method for making such a composite structure in accordance with an inventive arrangement, comprises the steps of: arranging a fabric layer in a configuration constrained against outward movement and defining a cavity between opposing surfaces of the fabric layer; dispensing a predetermined amount of a self-expanding, self-curable, uncured structural foam into the cavity, the foam expanding and curing in the cavity at a molding pressure determined by the predetermined amount of the foam and thereby attaching itself to the fabric layer to form the composite structure, the molding pressure causing the expanding foam to substantially fill only interstices of an inner portion of the fabric layer, without substantially penetrating an outer portion of the fabric layer; and, freeing the cured composite structure from the constraint of the arranging step, the outer portion of the fabric layer of the composite structure being thereafter substantially completely saturable with a curable material for lamination to another structure in a subsequent processing step.

The method can further comprise the step of laminating the cured composite structure to another composite structure by saturating the outer portion of the fabric layer of the cured composite structure with a curable resin.

The method can still further comprise the step of arranging a fabric composed of continuous thermoplastic fiber needle, punched together as a felt-like fiber layer in said configuration constrained against outward movement and defining said cavity.

The method can yet further comprise the step of selecting said fabric layer from one of: a polyester staple mat; a glass fiber mat; a organic fiber mat; and, an inorganic fiber mat.

The method yet further comprise the step of dispensing a predetermined amount of a two-part, self-expanding, self-curing urethane foam.

The method can yet further comprise the step of experimentally determining an amount of said dispensed foam to be sufficient to cause said foam to penetrate into interstices of said inner portion of said fabric layer as said foam expands and cures, without penetrating into said outer portion of said fabric layer.

DETAILED DESCRIPTION OF THE PREFERRED EMBODIMENTS

Figure 1:
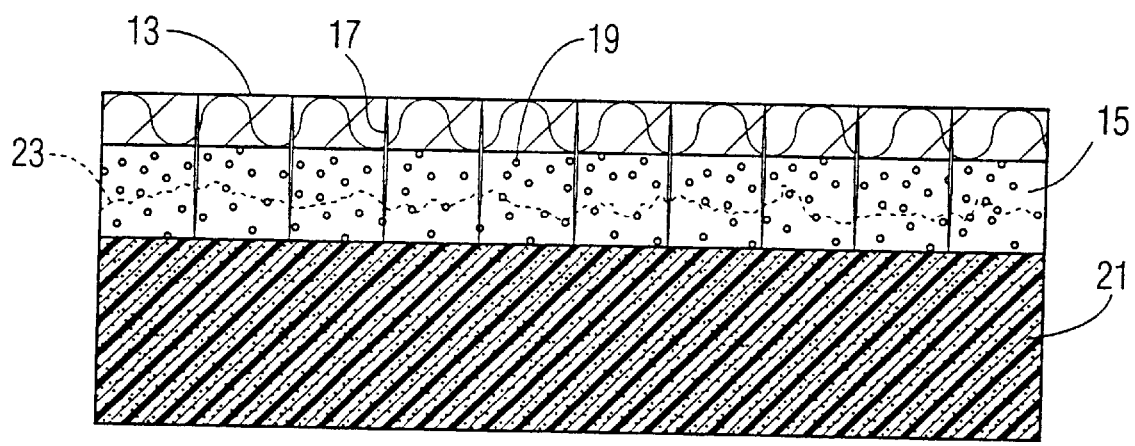
FIG. 1 is a partial, side cross-sectional view of a composite structure in accordance with the invention.

FIG. 1 illustrates a typical construction for a composite structure 11 in accordance with the invention. The structure 11 is made up of a reinforcing fiber layer 13, preferably a directional reinforcing fiber layer of organic or inorganic structural reinforcing fibers such as glass fiber, carbon fibers, aramid fibers such as is available under the name Kevlar, linear polyethylene or polypropylene fibers such as is available under the name Spectra, or polyester fibers. By reinforcing fiber is meant a fiber which when added to a composite material enhances the structural properties of the material. The fibers can be randomly oriented, or preferentially, they can be oriented in one or more directions. While a number of specific types of materials have been given for use as the reinforcing fiber layer, it will be appreciated by those of ordinary skill in the art that other equivalent-type reinforcing fiber layers can be employed in the practice of the invention.

The fiber layer 13 is attached to a fabric layer 15 which has a large number of interstices or pores 19. The fabric layer 15 is preferably a non-woven fabric composed of continuous thermoplastic fiber, needle punched together to yield a felt like fabric. One example of such a fabric is Trevira Spunbond, which is commercially available from Hoechst Celanese Corporation. However, the invention is not limited in this regard and the fabric layer 15 may be comprised of other materials, including polyester staple mat and glass fiber mat, as well as other organic and inorganic fiber mats and fabrics.

Preferably, the reinforcing fiber layer 13 and fabric layer 15 are secured to each other mechanically. Such mechanical attachment is typically done by conventional stitching 17. Other means of attachment, as noted previously, include alternatives such as needle punching, stapling or buttons. In the case of certain non-hostile environment applications even adhesives can be used as discussed previously.

A structural foam 21 is attached to the fabric layer 15 by having penetrated into the interstices 19 at penetration region 23 of the foam 21 during the manufacture of the structure 11. Preferably the foam is a self-expanding, self-curing urethane foam which has been caused to expand at region 23 into the interstices 19 of fabric layer 15 by having been filled into a mold in an amount sufficient to cause pressure as a result of expansion of the foam 21 to penetrate at region 23 into the interstices 19 of the fabric layer 15.

The interaction between the foam 21 and fabric layer 15 provides a number of mechanical advantages over other structures. More specifically, the low density urethane foams used in the practice of the invention typically have tensile strengths of about 50 pounds per square inch (psi) with an elongation of under 7%. When such a foam is expanded into a non-woven fabric, the mechanical properties of the fabric/foam system increases significantly. In the case where the fabric used is a continuous filament needle punched thermoplastic polyester fabric such as Trevira Spunbond, the mechanical properties of the Trevira/foam system increases to around 2,000 to 3,000 psi, with an elongation of over 20%. All of these non-woven fibers are typically non-woven organic or inorganic fiber mat, for example, polyester, fabrics of conventional construction.

Figure 2:
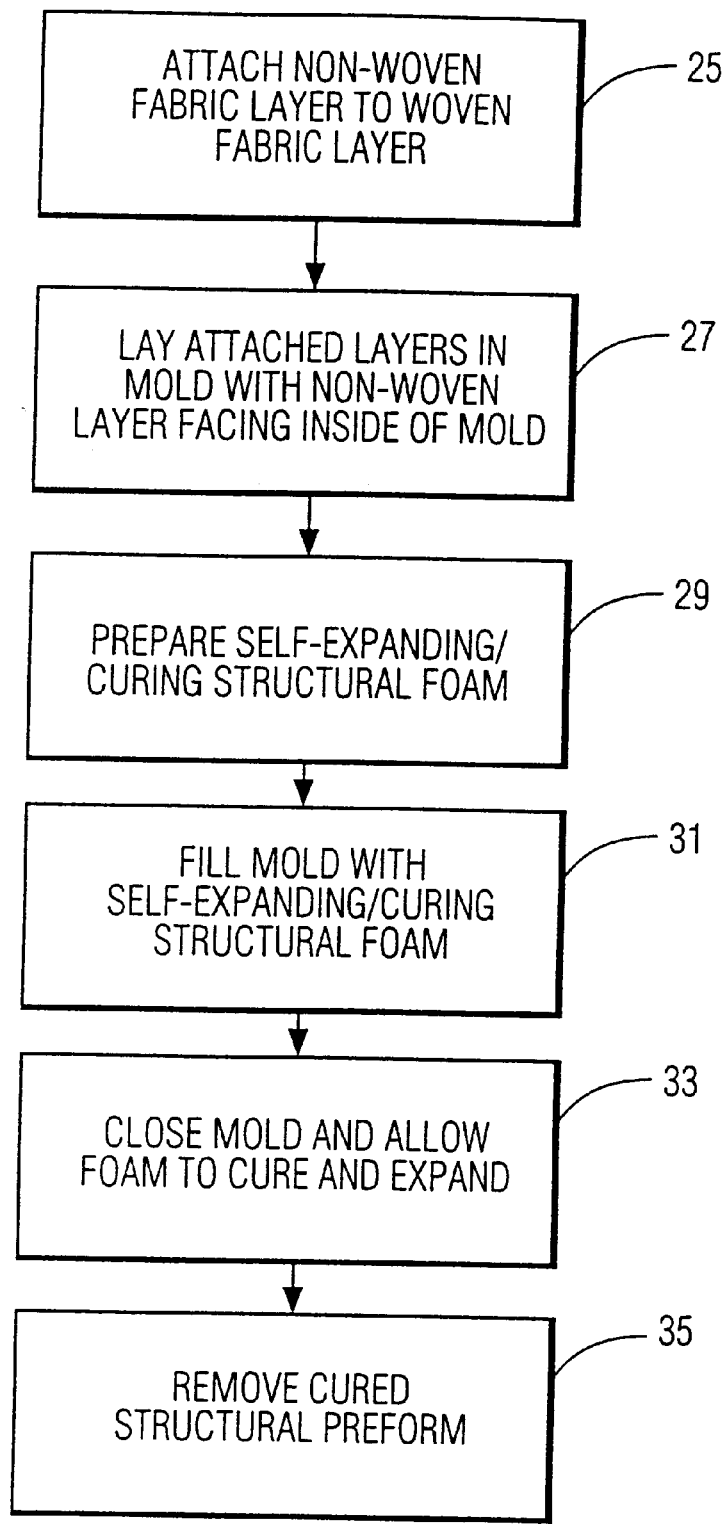
FIG. 2 is a block diagram showing the sequence of steps of making the composite structure in accordance with the method of the invention.

The method of making the composite structure in accordance with the invention is illustrated in FIG. 2. In a first step 25 the fabric layer 15 is attached to the reinforcing fabric layer 13. Preferably such attachment is done by stitching. Alternatively, as noted previously, the fabrics can be secured to each other by means of needle punching, staples or buttons or other mechanical technologies sufficient to secure one fabric to the other. After attaching the two layers of fabrics together, the attached layers are laid in a mold at a step 27 with the layer 15 facing the inside of the mold.

At step 29 a self-expanding, self-curing structural foam is prepared/mixed. Typically, such a self-rising, self-curing foam is a urethane foam commercially available from BASF, MOBAY, PPG and is typically an MDI-based rigid polyurethane foam (methylene-diphenyl-methane diisocyanate) using "hydrogenated chlorofluorocarbons" (HCFC), water and/or $CO_2$ as a blowing agent. The mold is then filled with the self-expanding and self-curing structural foam at step 31 in an amount sufficient to allow for expansion of the foam after the mold is closed. This generates enough pressure so that the foam penetrates into the interstices 19 of the fabric layer 15. On average, enough foam is added to generate pressures of about 5–18 "pounds per square inch" (psi), at a minimum 5 psi, and at an optimum pressure of 10 psi. Different mold pressure may be used, however, and upper pressure limits are dictated primarily by mold strength. For a given mold pressure, foam amounts and thickness of the non-woven layer can be adjusted so that mold completely fills with the foam, but the foam does not penetrate through the reinforcing layer. The mold is closed at step 33 and the foam is allowed to cure and expand therein. At step 35 the formed article is then removed after curing.

Figure 6:
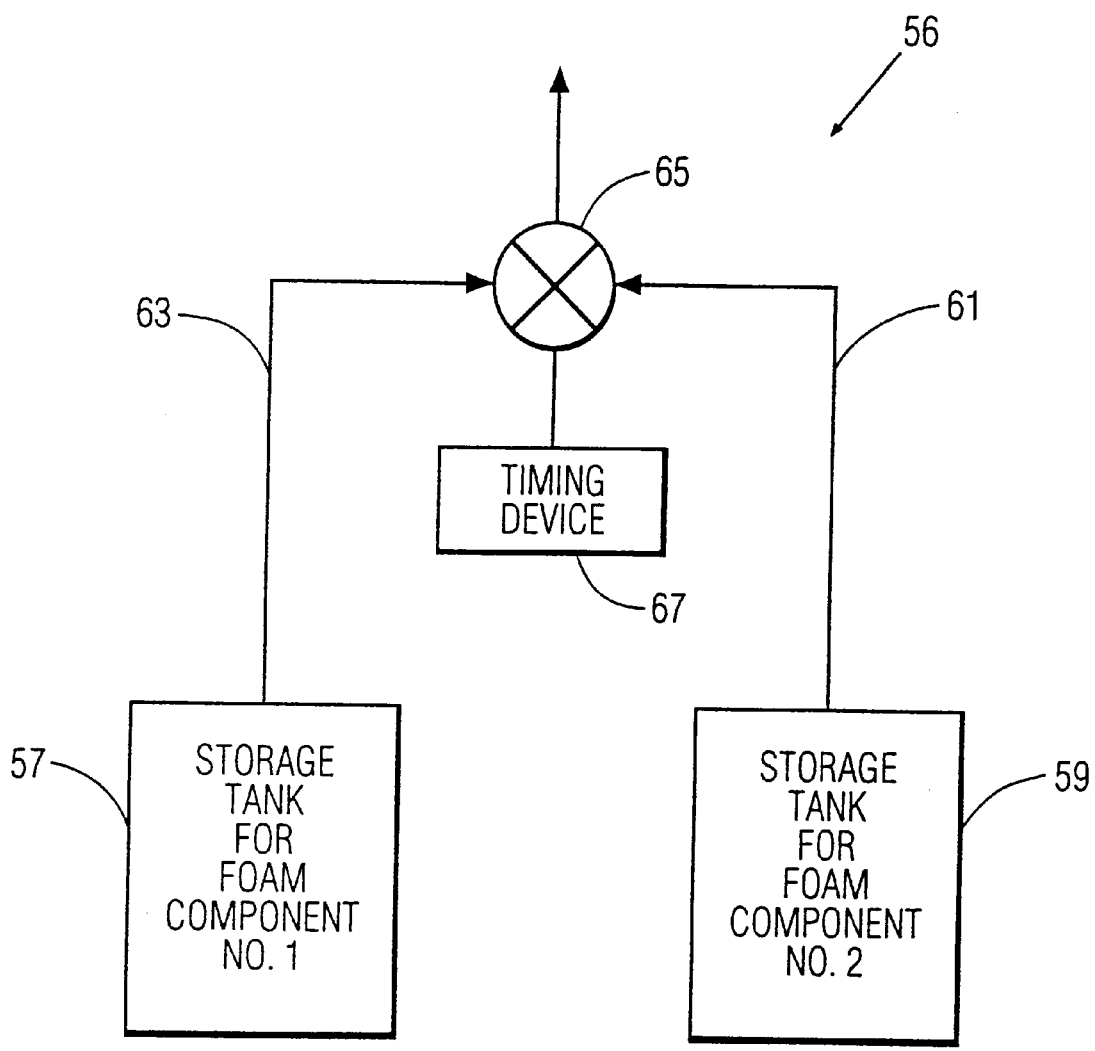
FIG. 6 is a block diagram showing a pressurized foam injection system having a time variable dispensing control system.
Figure 7:
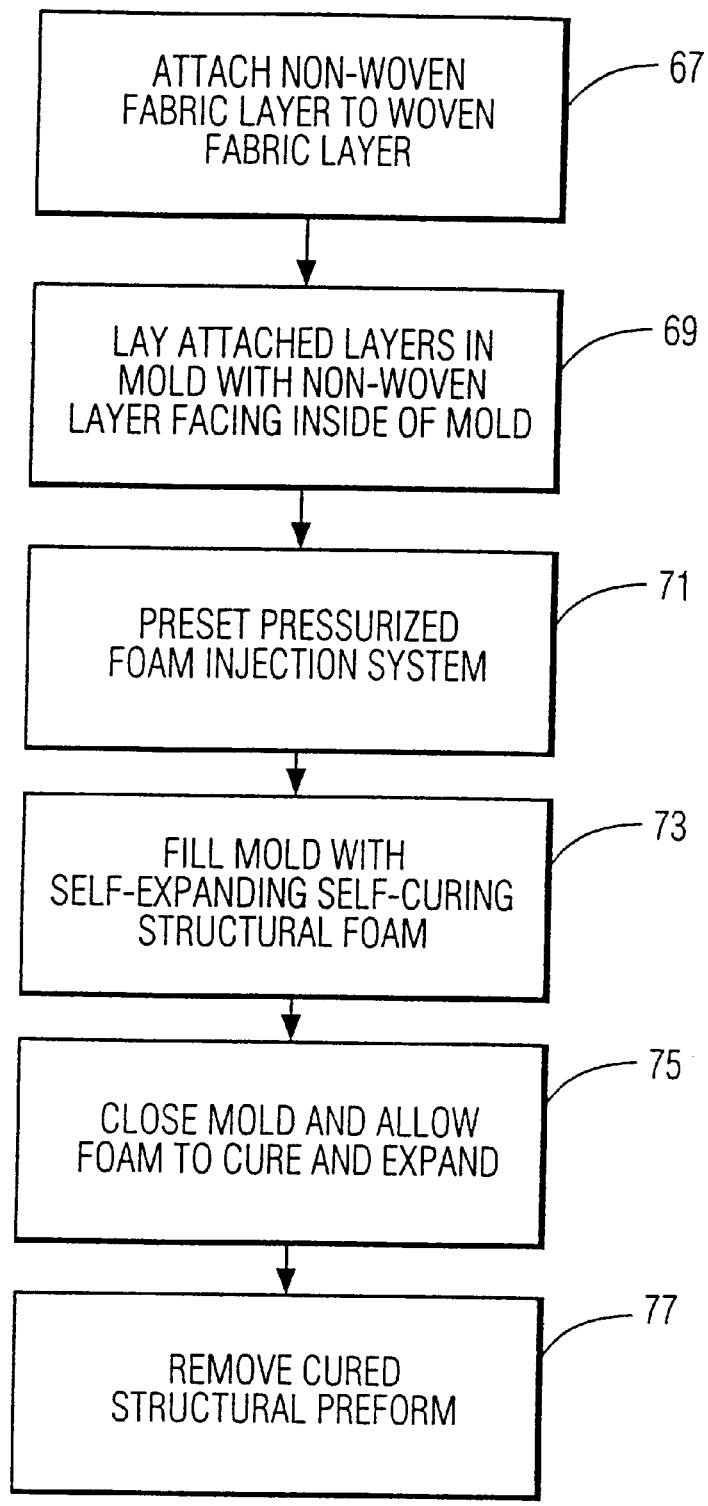
FIG. 7 is a block diagram showing a sequence of steps of making the composite structure in accordance with an alternative method of the invention.
Figure 8:
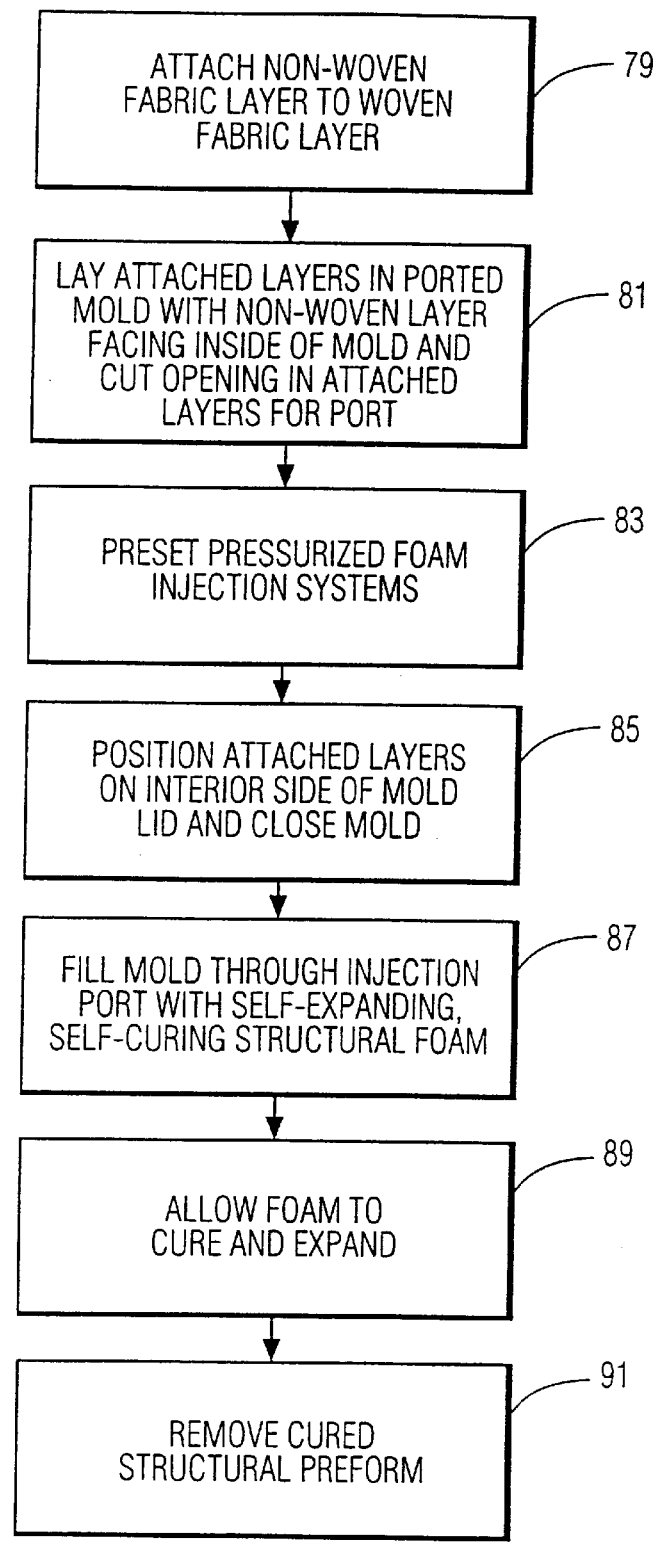
FIG. 8 is a block diagram showing a sequence of steps of making the composite structure in accordance with a second alternative method of the invention.

FIG. 6 shows a foam dispensing system for a two-part, self-expanding, self-curing foam which can be utilized for an alternative method according to the present invention as shown in FIGS. 7 and 8. The foam-dispensing system 56 includes storage tanks 57, 59 for separately storing the constituent materials which comprise the self-expanding, self-curing foam. The constituent foam materials are forced under pressure through hoses 61, 63 to nozzle 65. Nozzle 65 is provided for mixing the constituent materials necessary to form the self-expanding, self-curing foam, and dispensing said foam in a controlled manner. Nozzle 65 includes one or more valves to control dispensing of foam, which valves may be controlled by a timing device 67. Timing device 67 may be pre-set to cause the valves associated with nozzle 65 to open for a pre-determined duration, and thereby dispense a precisely-determined mass of self-expanding, self-curing foam.

An alternative method of making the composite structure in accordance with the present invention is illustrated in FIG. 7. In a first step 67, the fabric layer 15 is attached to the reinforcing fabric layer 13, as previously described. After attaching the two layers of fabric together, the attached layers are laid in a mold at a step 69 with the fabric layer 15 facing the inside of the mold.

At step 71, the foam-dispensing system is prepared to dispense self-expanding, self-curing structural foam. In this step, timing device 67 is preset to open the valves in nozzle 65 for a predetermined dispensing time, so that the foam-dispensing system releases a predetermined mass of foam upon command. At step 73, the foam-dispensing system is caused to fill the mold with self-expanding, self-curing structural foam. If the timing device for the foam-dispensing system has been preset, the mold will be filled with a precise amount of foam corresponding to the dispensing time set on the timing device 67 in step 71. At step 75, the mold is closed and the foam allowed to cure and expand. Finally, at step 77, the formed article is removed after curing.

A second alternative method of making the composite structure in accordance with the invention is illustrated in FIG. 8. Steps 79, 81 and 83 in FIG. 8 are identical to steps 67, 69 and 71, respectively, in FIG. 7, except that the mold is provided with a foam injection port to allow foam into the interior of the mold. The foam injection port may be comprised of any suitable opening formed in a wall of the mold or a mechanical fitting capable of allowing the passage of foam into the mold. If the injection port is comprised of a simple opening, it is preferably located on an upper area of the mold, such as the mold lid, to prevent foam from escaping as the mold is filled. An opening is cut in the attached layers where they cover the injection port to allow the passage of foam through the attached layers.

At step 85, rather than filling an open mold with self-expanding foam, the attached fabric layers are positioned on the mold lid, so that the woven fabric layer faces the lid, and the non-woven layer faces inside of the mold when the lid is closed. After the lid has been closed in step 85, the foam-dispensing system is activated in step 87 so that self-expanding, self-curing structural foam is dispensed into the mold through the injection port. If the timing device for the foam-dispensing system has been pre-set, the mold will be filled with a precise amount of foam corresponding to the dispensing time set on the timing device 67. At step 89, the foam is allowed to cure and expand. Finally, at step 91, the cured structural pre-form is removed from the mold.

With regard to the method of FIGS. 7 and 8, the precise mass of foam dispensed into the mold and the pre-set dispensing time set on the timing device for controlling said volume, are preferably determined experimentally to achieve penetration of said foam into the non-woven layer, but not into the woven layer of the attached fabric layers. The mold structure must be designed to withstand the pressure generated by the expanding foam. Typically, foam pressure may range from 5 to 18 psi.

In the method according to FIGS. 2, 7 and 8, one or more overflow ports can be provided on a portion of the mold to release excess foam, and limit foam pressure within the mold to a range of between 5 to 18 psi. The overflow port is preferably located on an upper area of the mold such as the mold lid. This placement prevents foam from escaping when the mold is initially filled, and permits foam to escape only after it has begun to expand. The overflow port can be comprised of a simple opening cut in a wall of the mold. Alternatively, a suitable fitting may be used which passes through a mold wall, and allows excess foam to escape the interior of the mold. If such overflow ports are used, a hole is cut in the attached fabric layers where they pass over the overflow port to allow the foam to escape the interior of the mold as it expands under pressure. In the method according to FIG. 8, the foam injection port can also serve as an overflow port. The size and number of the overflow ports are preferably determined experimentally to ensure that when excess foam has been added to a mold, the foam does not penetrate through the reinforced fabric layer.

The articles manufactured in accordance with the method of the invention can be molded in a variety of different shapes and applied in a number of different technologies. One specific application for the articles is in the boat building industry wherein the articles can be shaped as stringers to replace conventional wood stringers or glass fiber stringers used in the manufacture of glass fiber boats. The use of stringers in accordance with the practice of the invention results in a modular approach to boat manufacturing that saves the boat builder time and money, particularly for small boats. More specifically, conventional stringer systems take approximately six man hours to install. Stringers manufactured in accordance with the method of the invention require approximately twenty to forty man minutes to install on a cured hull. If the stringer system of the invention is installed and wet out with resin while the hull laminate resin is still "wet," i.e., uncured, molding time can also be significantly reduced. Thus, the process reduction results in substantial cost savings and decreased mold cycle times.

The stringers in accordance with the structure of the invention are especially adapted for use in boat construction. Typically, open-molded boat construction begins with a gel coat being first sprayed into a mold. Once the gel coat has cured, a skin coat consisting of chopped strand mat or chopped roving, woven roving or stitch bonded glass fiber is laid on the cured gel coat layer. This will result in the structural layer of the boat. Typically, such a layer is then impregnated with a resin and allowed to cure to form the structural layer, and the stringers are laid therein after curing.

Figure 3:
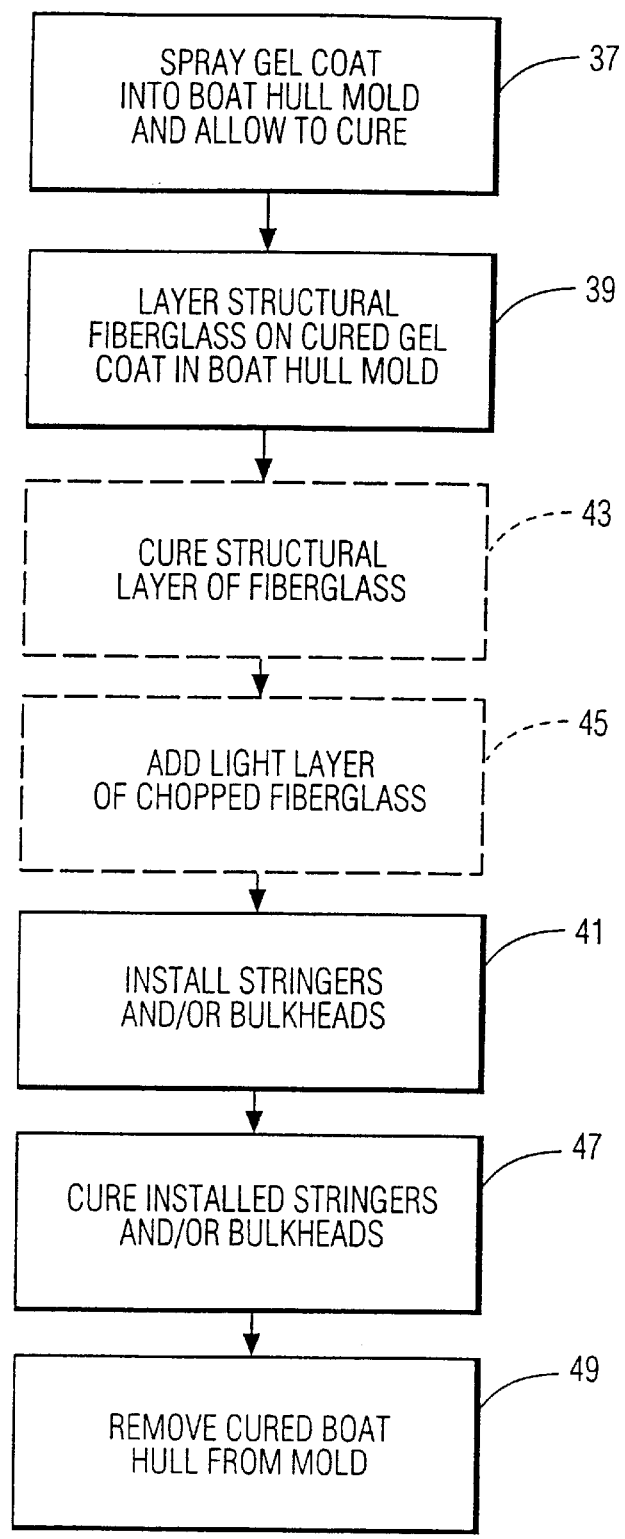
FIG. 3 is a block diagram showing a sequence of steps illustrating the method of manufacturing boats using the composite structure in accordance with the invention as stringers for the hull of the boat.

In accordance with the method of the invention as illustrated in FIG. 3, the gel coat is first sprayed at step 37 into a boat-hull mold and allowed to cure. The structural glass fiber is layered at step 39 in the same manner as in conventional boat construction. In a preferred aspect, the stringers are then installed at step 41, preferably with the layer of structural glass fiber having been impregnated and the stringers having been impregnated with a setting resin. At step 47 the installed stringers are then cured along with the structural layer, and at step 49 the boat hull is then removed from the mold.

In an alternative implementation, the structural glass fiber is initially cured at a step 43 and thereafter at step 45 a light layer of chopped glass fiber is added at the locations where the stringers are to be installed. In this alternative, the light layer of chopped glass fiber is impregnated with resin and the stringers are impregnated with resin and then installed. The entire system is then allowed to cure. The process follows thereafter the same as with the initially described process with reference to FIG. 3.

Figure 4:
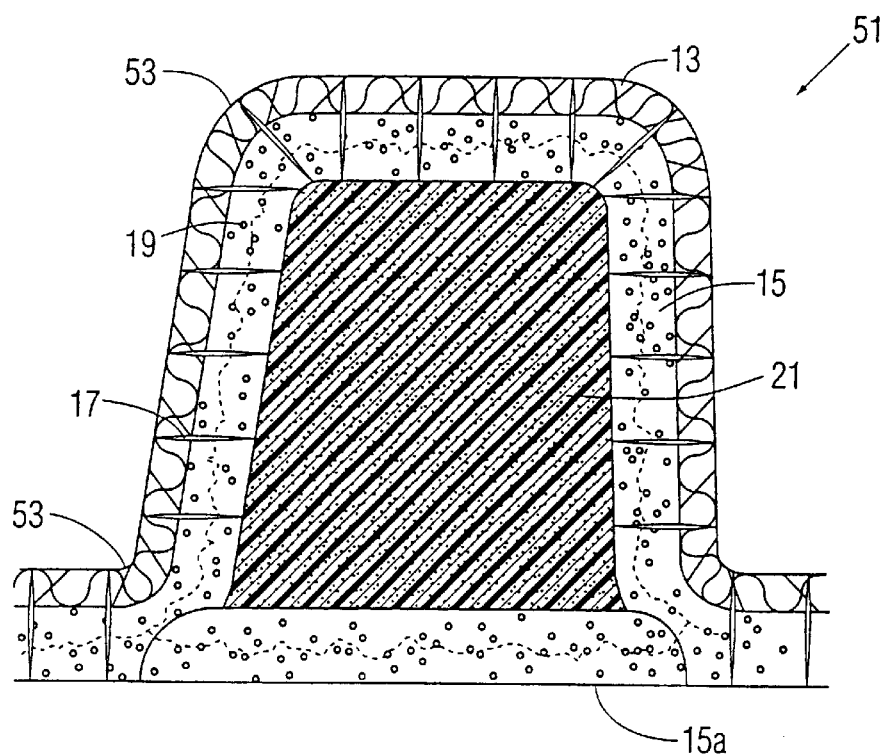
FIG. 4 is an end, cross-sectional view of a typical stringer construction made according to the method of the invention.

A number of advantages result in construction in accordance with the above-described system. First, as illustrated in FIG. 4, it will be appreciated that a stringer 51 in accordance with the structure of the invention can be made with rounded corners 53 which results in reduced stress on the cured glass woven fiber 13 as implemented in use in boat construction because resin impregnated cured glass fiber generally weakens at sharp corners. The appropriate shape of a mold in making the structure 11 of the invention can avoid such sharp corners. Optionally, to provide increased strength and toughness to the urethane foam 21, an additional layer 15*a* of non-woven fabric can be attached to the lid of the mold to ensure that the fabric becomes secured to the foam at a region wherein the reinforcing fabric 13, i.e., glass fiber, is not required. As noted previously, the use of the fabric layer interfaced with the foam 21 provides increased structural properties.

Figure 5:
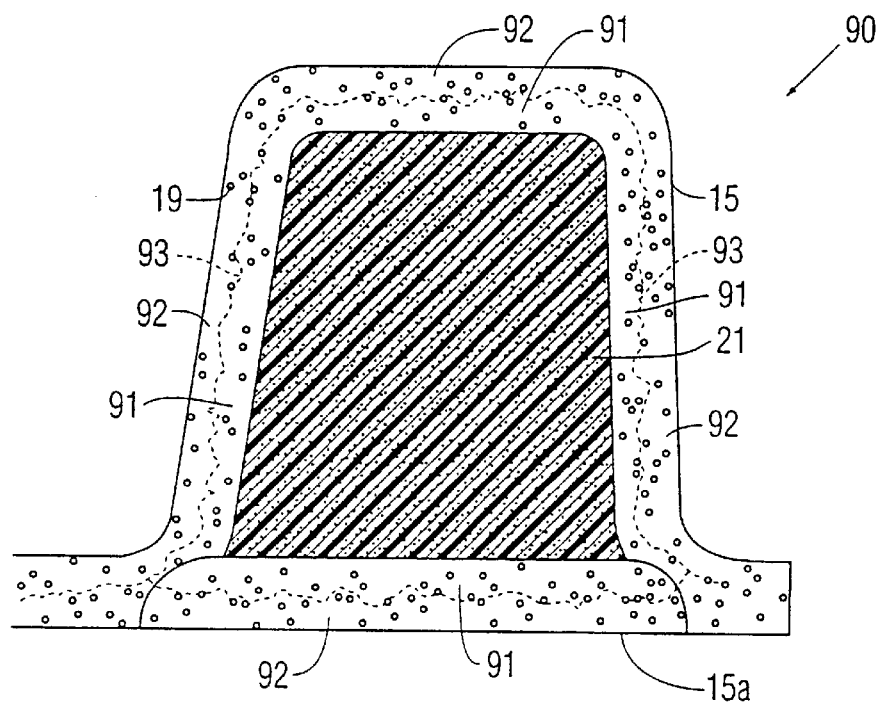
FIG. 5 is an end, cross-sectional view of an alternative embodiment to the stringer shown in FIG. 4, which omits the reinforcing fabric layer.

A lower strength, alternative embodiment of a composite structure 90 is shown in FIG. 5, wherein only the fabric layer 15 is utilized, without the reinforcing layer 13, as in the bottom of the stringer shown in FIG. 4. In this embodiment, and in accordance with an inventive arrangement, a predetermined amount of a self-expanding, self-curable, uncured structural foam is dispensed into the cavity 21. The foam expands and cures in the cavity at a molding pressure determined by the predetermined amount of the foam and thereby attaches itself to the fabric layer to form the composite structure. The molding pressure causes the expanding foam to substantially fill only interstices 19 of an inner portion 91 of the fabric layer, without substantially penetrating an outer portion 92 of the fabric layer. An illustrative border between the inner and outer portions is represented by a jagged dashed line 93. After freeing the cured composite structure from the constraint of the arranging step, the outer portion 92 of the fabric layer of the composite structure is substantially completely saturable with a curable material for lamination to another structure in a subsequent processing step. Such other structure may include, for example, spas, baths, Jacuzzis, shower enclosures and the like. The composite structure in accordance with this inventive arrangement is especially adapted for use in lower stress environments than such composite structure technology has generally been applied to in the past. Significantly, however, it can be adapted for use in applications requiring higher strength. For example, if the composite structure is used as a structural reinforcing component, additional layers of reinforcing fabric may be laminated over the basic composite structure to enhance its strength.

While the invention has been described with reference to its use as stringers or bulkheads for boats, it will be appreciated by those of ordinary skill in the art that other uses can be made of the composite structures in accordance with the invention. For example, such structures can be used as reinforcing elements for automobile body parts such as hood and trunk lids, bumper beams and structural framing. Likewise, another use can be in architectural applications where the structures could be integrated into panel fabrication processes as structural ribs or stiffeners.

Although particular preferred embodiments of the invention have been disclosed in detail for illustrative purposes, it will be recognized that variations or modifications of the disclosed invention, including the use of additional layers of fabric, alternative types of self-expanding foam, and various alternative adhesive or synthetic resins, lie within the scope of the present invention.

What is claimed is:

1. A method for making a composite structure, comprising the steps of:

arranging a single fabric layer in a configuration constrained against outward movement and defining a cavity between opposing surfaces of said fabric layer;

dispensing a predetermined amount of a self-expanding, self-curable, uncured structural foam into said cavity, said foam expanding and curing in said cavity at a molding pressure determined by said predetermined amount of said foam and thereby attaching itself to said fabric layer to form said composite structure, said molding pressure causing said expanding foam to substantially fill only interstices of an inner portion of said fabric layer, without substantially penetrating an outer portion of said fabric layer; and, freeing said cured composite structure from said constraint of said arranging step, said outer portion of said fabric layer of said composite structure being thereafter substantially completely saturable with a curable material for lamination to another structure in a subsequent processing step.

2. The method of claim 1, further comprising the step of:

positioning said cured composite structure adjacent to a second composite structure so that the outer portion of said fabric layer of said cured composite structure is in contact with said second composite structure;

saturating with a curable resin said outer portion of said fabric layer of said cured composite structure and an outer portion of said second composite structure and permitting said resin to cure.

3. The method of claim 1, comprising the step of arranging a non-woven fabric composed of continuous thermoplastic fiber needle—punched together as a felt-like fiber layer in said configuration constrained against outward movement and defining said cavity.

4. The method of claim 3, comprising the step of selecting said non-woven fabric layer from one of: a polyester staple mat; a glass fiber mat; a organic fiber mat; and, an inorganic fiber mat.

5. The method of claim 1, comprising the step of dispensing a predetermined amount of a two-part, self-expanding, self-curing urethane foam.

6. The method of claim 1, comprising the step of experimentally determining an amount of said dispensed foam to be sufficient to cause said foam to penetrate into interstices of said inner portion of said fabric layer as said foam expands and cures, without penetrating into said outer portion of said fabric layer.

* * * * *